(12) United States Patent
Roberts

(10) Patent No.: US 8,016,535 B1
(45) Date of Patent: Sep. 13, 2011

(54) SPIN LOCK

(76) Inventor: Niels C. Roberts, Scottsdale, AZ (US)

( * ) Notice: Subject to any disclaimer, the term of this patent is extended or adjusted under 35 U.S.C. 154(b) by 175 days.

(21) Appl. No.: 12/386,370

(22) Filed: Apr. 17, 2009

Related U.S. Application Data

(60) Provisional application No. 61/125,740, filed on Apr. 28, 2008.

(51) Int. Cl.
*F16B 37/14* (2006.01)
(52) U.S. Cl. .............. 411/429; 411/373; 70/232
(58) Field of Classification Search ............... 411/429; 70/229, 331, 232
See application file for complete search history.

(56) References Cited

U.S. PATENT DOCUMENTS

| | | | |
|---|---|---|---|
| 1,604,690 A | 10/1926 | Halaby | |
| 1,625,901 A | 4/1927 | Lay | |
| 1,748,422 A * | 2/1930 | Lee | 70/232 |
| 1,767,643 A | 6/1930 | Baird | |
| 1,937,848 A | 12/1933 | Shinn | |
| 2,322,347 A * | 6/1943 | Churchman | 70/232 |
| 2,345,949 A * | 4/1944 | Robbins | 70/232 |
| 2,648,971 A * | 8/1953 | Jones | 70/229 |
| 3,060,786 A * | 10/1962 | Flower | 411/432 |
| 3,540,245 A | 11/1970 | Pope | |
| 3,605,460 A * | 9/1971 | Singer | 70/232 |
| 3,789,635 A * | 2/1974 | Van Brunt et al. | 70/232 |
| 4,203,382 A * | 5/1980 | Mullen | 116/28 R |
| 4,336,698 A * | 6/1982 | Hurd | 70/231 |
| 4,710,082 A * | 12/1987 | Curtis | 411/373 |
| 4,856,305 A * | 8/1989 | Adams | 70/58 |
| 4,856,307 A | 8/1989 | Hauser | |
| 4,875,819 A | 10/1989 | Wilkinson | |
| 4,884,422 A | 12/1989 | Wolter | |
| 5,364,213 A * | 11/1994 | Teramura | 411/431 |
| 5,630,687 A * | 5/1997 | Robinson | 411/372.6 |
| 6,854,302 B2 * | 2/2005 | Zapushek et al. | 70/34 |
| 2004/0126202 A1 * | 7/2004 | Somers et al. | 411/429 |

* cited by examiner

*Primary Examiner* — Gary Estremsky
(74) *Attorney, Agent, or Firm* — Harpman & Harpman

(57) ABSTRACT

A wheel lock device wherein a locking lug nut is threadably engaged on a vehicle wheel. A security sleeve is removably secured over the hex portion of the lug nut preventing unauthorized engagement and removal thereof. A retainment fastener secures the security sleeve to the modified lug nut by an integrated removal and placement rotational key tool.

2 Claims, 3 Drawing Sheets

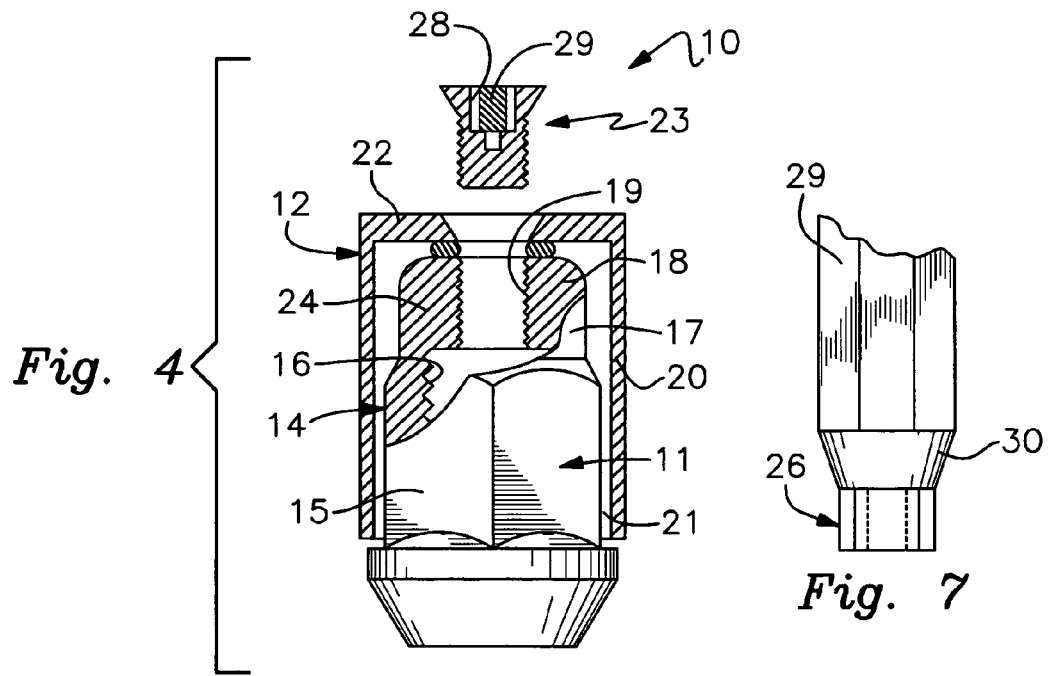
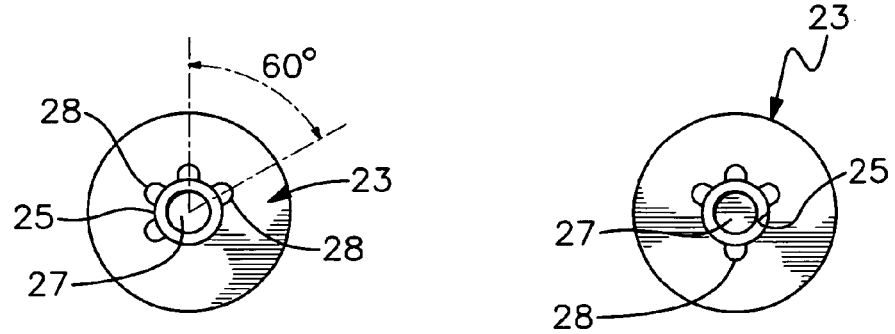

SPIN LOCK

This application claims benefit of U.S. Provisional Application No. 61/125,740, filed Apr. 28, 2008.

BACKGROUND OF THE INVENTION

1. Technical Field

This invention relates to security devices for vehicle wheels to prevent their unauthorized removal.

2. Description of Prior Art

Prior art devices of this type have been directed to a variety of wheel locks. Such devices most commonly use a modified wheel lug nut in which a configured opening is formed within the lug nut and is engaged by a corresponding matching insert on a socket that allows the nut to be directly rotated thereby.

Other prior art can be seen, for example, in U.S. Pat. Nos. 1,604,690, 1,625,901, 1,767,643, 1,937,848, 3,540,245, 4,336,698, 4,875,819, 4,856,307 and 4,884,422.

In U.S. Pat. No. 1,604,690 a nut lock device can be seen having a housing with a cylinder lock registerably engaged therewithin.

U.S. Pat. No. 1,625,901 is directed to a nut guard having a head extending over a nut with a key lock securing same to a modified nut.

U.S. Pat. No. 1,937,848 discloses a lock for vehicle lug nuts having an overlying split sleeve as secured by multiple key operated tumbler type lock.

U.S. Pat. No. 3,540,245 claims a tamper proof lock nut having multiple sleeve combination with an outer security sleeve secured by multiple tumbler key type lock insert.

A lug nut lock can be seen in U.S. Pat. No. 4,336,698 having a cylinder portion on which is rotatably mounted a sleeve with a hex engagement portion.

U.S. Pat. No. 4,875,819 discloses a wheel locking system having a butterfly latch interengaged with a split ring in main hexagonal body when positioned within access slots.

U.S. Pat. No. 4,856,307 shows a wheel locking device having a cylinder lock securing a sleeve over a hex nut engagement surface restricting access and removal thereof.

Finally, in U.S. Pat. No. 4,884,422 a wheel nut lock is shown having a sleeve covering the nut engagement surface. A locking cylinder projects for co-operation with a radial shoulder on the head of the nut securing same thereto.

SUMMARY OF THE INVENTION

What is needed is a low cost, durable wheel lug security system that can be locked and then unlocked with a key. It needs to be installed and removed with standard tools. The invention provides such a system by utilizing a base retainer that secures the locking system to the bolt and a rotating cap assembly that is a smooth cylinder that spins freely when the system of the invention is locked.

DESCRIPTION OF THE DRAWINGS

FIG. 4 is cross-section exploded assembly view of the lock nut and overlying security sleeve of the invention.

FIG. 5 is a graphic representation of the access key combination for placement and removal.

FIG. 6 is a graphic representation of the placement key combination for placement and removal.

FIG. 7 is an enlarged partial side elevational view of the placement and removal key.

DETAILED DESCRIPTION OF THE INVENTION

Figure 1:
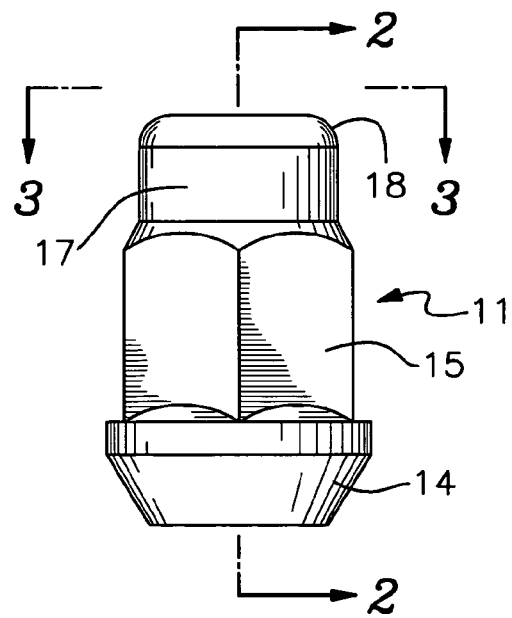
FIG. 1 is a side elevational view of the lock nut portion of the locking device.
Figure 2:
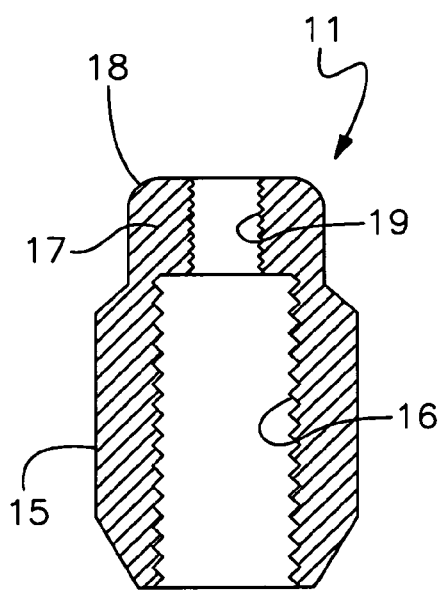
FIG. 2 is a section on lines 2-2 of FIG. 1.
Figure 3:
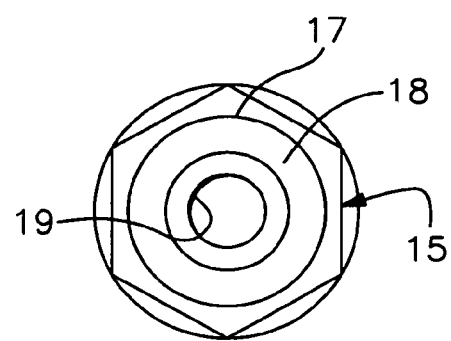
FIG. 3 is a top plan view on lines 3-3 of FIG. 1.

Referring to FIG. 4 of the drawings, a wheel nut lock 10 of the invention can be seen having a lug nut portion 11 and a locking sleeve portion 12. The lug nut portion 11 has a circular head 13 with a plug section 14 and hexagonal engagement body 15 extending therefrom. A threaded bore 16, best seen in FIGS. 1 and 6 of the drawings provides for threaded engagement on the vehicle's wheel mounting studs (not shown) as is typical and well understood by those skilled in the art for mounting the wheels to a vehicle (not shown). An area of reduced transverse dimension at 17 extends from the hexagonal engagement body 15 having a rounded end 18 with a center threaded bore 19 therein.

The locking sleeve portion 12 of the invention, best seen in FIG. 4 of the drawings has a cylinder sleeve 20 with an open end at 21 and an oppositely disposed apertured close end 22. The sleeve 20 serves to cover the hexagonal engagement body 15 prevent unauthorized engagement and therefore removal by conventional lug nut engagement tools well known within the art.

The interior dimensions of the sleeve 20 is such that it will slidably engage over both the hexagonal body 15 and an area of reduced transverse dimension at 17 with self-alignment of the apertured closed end 22 with the threaded bore 19 as will be disclosed in greater detail hereinafter.

The sleeve 20 is secured over the nut portion 12 by a keyed locking bolt 23 through the central aperture closed end 22 and registerably engages with the threaded bore 19 in the rounded end 18 of the plug section 14 of the nut portion 11. An O-ring 24 is provided as a bearing surface between the cylinder sleeve 20 and the rounded end 18, best seen in FIG. 4 of the drawings.

Figure 9:
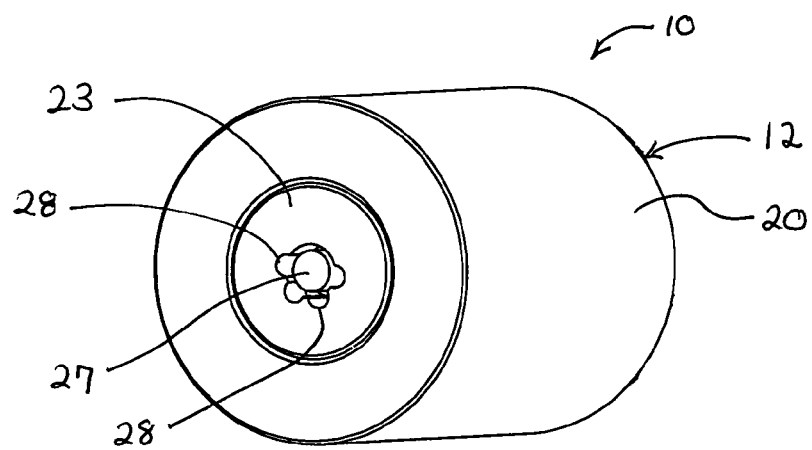
FIG. 9 is a perspective view of the assembled vehicle security lock nut as seen generally in FIG. 4 of the drawings.

Referring now to FIGS. 5, 6 and 9 of the drawings, the locking bolt 23 has a configurable keyway 25 therein which restricts bolt engagement and rotation to a correspondingly configured key 26 as seen in 7 and 8 of the drawings. The bolt keyway 25 has a center upstanding registration guide pin 27 and a plurality of arcuate recesses 28 positioned annularly about an inner keyway's surface wall 28. It will be apparent that a multiple unique combination of recesses 28 positions are possible as illustrated in FIGS. 5, 6 and 9 of the drawings affording different keyways 25 and therefore associated configured key elements 26.

Figure 8:
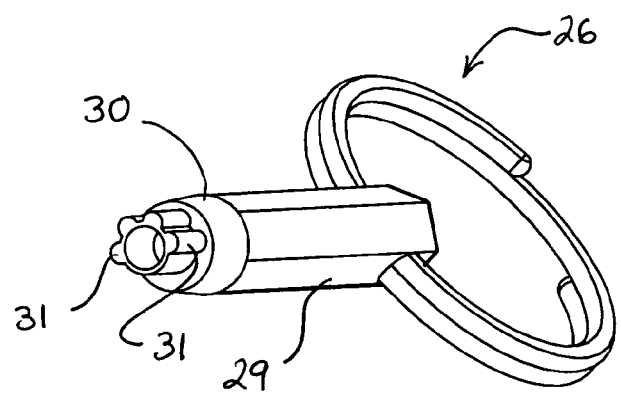
FIG. 8 is a perspective view of the placement and removal key.

The corresponding keyway pattern key element 26 can be seen in FIGS. 7 and 8 of the drawings, having a main key body 29 with a tapered transition fusto conical portion 30. A configured key element has a cylindrical configuration with an inner diameter opening equal to and for engagement over the hereinbefore described central guide pin 26 of the bolt keyway 25. A number of elongated arcuate tabs 31 extend annularly thereabout which match the corresponding keyway recesses 28 patterns. This allows the key 26 to be inserted into the corresponding keyway 25 of the bolt 23 and rotated for threadably mounting and securing the cylinder sleeve 20 while removing same from the so-defined nut portion 11.

Referring to FIGS. 5 and 6 of the drawings, examples of a configured keyway 25 combinations can be seen illustrated in different positioning of the respective arcuate recesses 28 annularly thereabout. The angular degree of separation of the respective adjacent arcuate recesses 28 is 60° afforded in this example up to six positions with at least one oppositely disposed aligned pair of recesses to assure ease of the bolt 23 keyway engagement by the key 26 and rotation thereof.

It will noted that the O-ring 24 is registerable about the bolt 23 to provide, as noted, a compressible bearing surface between the interior of the apertured closed end 22 of the sleeve 20 and the surface of the rounded end 18 of the hexagonal engagement body 15.

The nut portion 11 and lockable sleeve portion 12 are preferably made of metallic material for practicality and security with the bolt keyway 25 being preferably formed of case hardened metal and insertable into the key locking bolt 23 by conventional press fit application understood in the art.

It will be noted that other user applications will be apparent to is those in the art such as marine environments, or others wherein a security locking system for mounting bolts could be used.

It will thus be seen that a new and novel vehicle wheel locking device 10 has been illustrated and described and that various changes and modifications may be made thereto without departing from the spirit of the invention.

Therefore I claim:

1. A device for securing wheels from unauthorized removal comprises,
    a lug nut having a hexagonal engagement body,
    a cylinder sleeve having an open lug nut engagement end and an apertured closed end,
    a rounded end on said wheel lug nut with a threaded aperture centrally positioned therewithin,
    a key locking bolt removably securing said security cylinder sleeve over said wheel lug nut,
    a contoured keyway having a plurality of spaced arcuate recess around a center guide pin in said locking bolt and a corresponding contoured key having a plurality of tabs registerable in said keyway for rotation of said locking bolt, and a resilient bearing O-ring between said security cylinder sleeve and said lug nut.

2. The device for securing wheels set forth in claim 1 wherein said lug nut and said security cylinder sleeve and said locking bolts security said sleeve over said wheel lug nut are preferably made of metal.

\* \* \* \* \*